(12) United States Patent
Lehmann

(10) Patent No.: US 9,960,799 B2
(45) Date of Patent: May 1, 2018

(54) MOBILE PHONE CASE TO REDUCE EXPOSURE TO MICROWAVE RADIATION

(71) Applicant: Harry V. Lehmann, Novato, CA (US)

(72) Inventor: Harry V. Lehmann, Novato, CA (US)

(73) Assignee: Green Swan, Inc., Novato, CA (US)

( * ) Notice: Subject to any disclaimer, the term of this patent is extended or adjusted under 35 U.S.C. 154(b) by 467 days.

(21) Appl. No.: 14/149,604

(22) Filed: Jan. 7, 2014

(65) Prior Publication Data

US 2014/0194168 A1 Jul. 10, 2014

Related U.S. Application Data

(60) Provisional application No. 61/749,693, filed on Jan. 7, 2013.

(51) Int. Cl.
*H04B 1/3827* (2015.01)
(52) U.S. Cl.
CPC .................................. *H04B 1/3838* (2013.01)
(58) Field of Classification Search
CPC .................................................... H04B 1/3838
See application file for complete search history.

(56) References Cited

U.S. PATENT DOCUMENTS

| | | | | |
|---|---|---|---|---|
| 2001/0053673 | A1* | 12/2001 | Toyoda et al. | 455/90 |
| 2004/0077391 | A1* | 4/2004 | Nuovo | H04M 1/0249 455/575.8 |
| 2008/0017812 | A1* | 1/2008 | Dandurand | 250/503.1 |
| 2008/0091238 | A1* | 4/2008 | Colliard | 607/3 |
| 2011/0256391 | A1* | 10/2011 | Nguyen et al. | 428/343 |
| 2014/0128132 | A1* | 5/2014 | Cox, III | H04B 1/3888 455/575.8 |
| 2014/0159980 | A1* | 6/2014 | Finegold | 343/833 |
| 2015/0060505 | A1* | 3/2015 | Brown | B29D 99/006 224/235 |
| 2016/0072933 | A1* | 3/2016 | Cox, III | H04M 1/185 455/575.8 |

OTHER PUBLICATIONS

Swicord, M.L., Davis, C.C., "An Optical Method for Investigating the Microwave Absorption Characteristics of DNA and other Biomolecules in Solution," Journal of Bioelectromagnetics, 1983; vol. 4(1);21-42; abstract.

\* cited by examiner

*Primary Examiner* — Cindy Trandai
(74) *Attorney, Agent, or Firm* — Duane Morris LLP

(57) ABSTRACT

A case containing DNA material protect the user from non-ionizing radiation emitted from a mobile phone, while protecting the phone from physical damage. The DNA material absorbs the radiation emitting from the transmitter of the mobile phone. Layers of DNA material along with non-organic layers are advantageously combine to increase the absorption. The DNA material may be used form the case or be provided and an insert to a prior art case.

16 Claims, 4 Drawing Sheets

MOBILE PHONE CASE TO REDUCE EXPOSURE TO MICROWAVE RADIATION

CROSS REFERENCE

This application is a non-provisional application of and claims priority benefit of provisional application No. 61/749,693 entitled "CELLULAR TELEPHONE CASE, WHICH, BY ABSORPTION OF MICROWAVE AT IN INCREASE RATE OVER OTHER MEANS, RESULTS IN REDUCED EXPOSURE TO MICROWAVE RADIATION TO CELL TELEPHONE USERS, AND OTHER APPLICATIONS" the entirety of which is incorporated by reference.

BACKGROUND

Strong science shows that microwaves are absorbed by living tissues at 24 times the rate of their absorption by pure water. While the Specific Absorption Rate, one standard by which cellular microwave absorption by the body is commonly measured, is typically based upon a penetration through an inert emulation of a human head, competent experimental work indicates that the level of absorption in living tissue is many times greater than the level of microwave absorption through an inert liquid, such as water. In a 1983 study, reported upon as An Optical Method for Investigating the Microwave Characteristics of DNA and other Biomolecules in Solution, by Mays L. Swicord and Christopher C. Davis, published in the journal *Bioelectromagnetics*, experimental results were reported which determined that: "A significant increase in the absorption of DNA solutions as compared with pure water has been observed that is consistent with microwave absorption by the longitudinal mode of the double helix." Thus, in their conclusion Swicord and Davis state that: "However, the results presented in this work are in good agreement with the Prohofsky model of acoustic mode absorption by varying lengths of DNA. Prohofsky and Van Zandt predicted that 450 to 2000 base pair segments of synthetic DNA should absorb $10^3$ to $10^4$ times as strongly in the microwave region as an equivalent mass of water with a decrease in peak absorption due to water damping. The 1.7% dilution of DNA investigated by PFLOH spectroscopy in this work indicated a 40% increase in absorption above pure water at 8 GHz and at 10 to 12% increase at 12 GHz. The measured DC conductance of this DNA sample was quite low yet its absorption coefficient was still 25% higher at 8 GHz than a saline solution of 20 times greater DC conductance. They concluded that the observed absorption of the DNA solution does not come from ionic behavior. The observed absorption is suggestive of direct microwave absorption by the longitudinal acoustic mode of the double helix discussed by Prohofsky and co-workers. Based on the concentration of the DNA solution which gave 40% more absorption than pure water at 8 GHz, the microwave absorption of DNA at this frequency is 24 times greater than an equivalent mass of water."

Other Competent scientific studies [i.e. H. Lai et al, from the University of Washington, 1984, 1988, and as presented in 1998, Vienna, Austria, and 2009 in Stavanger, Norway; O. Johansson, Associate Professor, Dept. of Neuroscience of the Karolinska Institute, Stockholm, and Professor, Royal Institute of Technology, Stockholm, as presented in 2009 at Stavanger, Norway; Carl F. Blackman a founder of the Bioelectromagnetics Society, as presented in 2009, at Stavanger, Norway; Martin Blank, Ph.D., Associate Professor, Columbia University, as presented in 2009 Stavanger, Norway, Franz Adlkofer, M. D., doctorate from the Max Planck Institute for Biochemistry as presented at Stavanger Norway, 2009, also the following presenters at the International EMF Conference 2009 at Stavanger, Norway: Lukas h. Margaritis, Ph.D, Greece; Elihu D. Richter, MD, M.P.H., Israel; Alvaro Agusto A. de Salles, Ph.D., Brazil; Fredrik Soderqvist, Ph.D., Sweden, Yuri G. Grigoriev M. D. Sci., Russia; Anton V. Merkulov Ph.D., Russia], have shown potential health risks, in some instances showing DNA breakage, as associated with human exposure to non-ionizing radio wave sources, including but not limited to those emitted from mobile telephone devices and handsets, including but not limited to cellular telephones.

Cellular telephone manufacturers consistently inform purchasers of these devices that they are not to be held close to the body. These warnings are typically provided in small print in small booklets sold with the devices, or are in warnings at Internet positions, with the addresses for such positions ("User's Manuals") sold with the cellular phone involved. Below is a chart which illustrates typical proximity warnings given with cellular devices at time of sale:

In addition to the scientific studies above cited, recent studies have confirmed an inverse relationship between the carrying of cellular telephones by me and the rate of live sperm ejaculate form such men. For example, in a study scheduled for publication in the journal Andrologia, but posted online in March of 2012, researchers at the Medical University of Graz showed results from examination of 2,110 men treated at the university's fertility clinic form 1993 to 2007; 1,119 of those men did not at the time of the study use cellphones. That allowed researchers to compare non-users to users of cellular devices. Result: in users an average of 68 percent of the sperm had a pathological morphology, compared to 58 percent in those who did not use cellphones. Results in both examples are higher than generally expected, since the universe tested was of reporters to a fertility clinic, but the differential is substantial. Subsequent studies, including but not limited to a team of scientists led by Ashok Agarwal, the Director of Research at the Center for Reproductive Medicine at the Cleveland Clinic showed, in men who used cell phones experienced "decreases in semen quality in men by decreasing the sperm count, motility, viability, and normal morphology," or, as Dr. Agarwal stated: "semen quality tended to decline as daily cell phone use increased." Other studies have shown motility and live sperm count diminishment in a static setting by sample in comparison between those samples held in cellular telephone proximity, and those not so held. Emerging demographic information is consistent with a very substantial decrease in sperm quality during the recent high ascendency of cellular phone use by men, and accompanying carriage by men of cellular telephones in their front pockets, such as the study announced by Dr. Grace Centola, president of the Society of Male Reproduction and Urology in Birmingham, Ala., and most dramatically, a recent French study has shown a stunning 32% decline in the rate of live sperm in French men in recent years, in particular the last decade: Dr. Joelle Le Moal from the Institut de Veille Sanitaire in France, in announcing the study, writing in the journal Human Reproduction, showed very recent sperm count diminishment in other countries as well, including India, Israel, and New Zealand. Researchers have also found that there is a higher rate of deformity in sperm in men engaged in long term cellular device use.

Despite the warnings noted above, humans frequently carry cellular telephones in the "on" condition in positions in direct contact with their bodies, such as carriage in the front pants pocket by men, and in various pockets by women, including in bras, which puts the so-carried cellular devices in a state of continuing very close contact with the body of the consumer, contrary to the express warnings provided.

Based upon the Mayes-Swicord study and as otherwise above referenced, the production of cellular telephone cases of DNA containing material is provided that may result in a case which will absorb far more non-ionizing radiation than other materials which do not contain DNA, with the level of absorption increasing in direct relationship to the density of the DNA-containing material involved.

The disclosed subject matter describes that this effect may be enhanced by layering of DNA types, such as by lamination of dense wood layers, and by the layering of materials containing animal-generated DNA over dense vegetable-source DNA, such as high density woods. The absorption may also be enhanced in practical effect by the interjection of other radiation diffusing materials, such as through the introduction of ferrite micro-spheres or nano-spheres into adhesives used to layer DNA rich materials in case construction, and by the use of finishing materials having similar intent.

The disclosed subject matter may serve to protect men who use it against decrease in sperm quality, and thereby protect their reproductive health. From the scientific reportage quoted above on the general impacts of microwave on DNA, such as the work of Dr. Lai, such highly absorptive high DNA content materials in cases will serve to offer protection to women as well. The Disclosed subject matter enhances these effects by layering of differing materials, including in context of offering diffuse molecular orientations of DNA within a case due to such alteration of material or grain in construction.

Decorative telephone cases exist in the current market but due to the sought and made light density of existing cases, and the absence of layering, including multi-type and cross-grain layering, and the presence of air in the materials involved, the capacity of such decorative cases to absorb microwave radiation is very limited.

The disclosed subject matter overcomes or mitigates deficiencies of the prior art by advantageously absorbing radiation. These and many other benefits of the disclosed subject matter will be readily apparent to one skilled in the art to which the invention pertains from a perusal of the claims, the appended drawings, and the following detailed description of the preferred embodiments.

The following detailed description of preferred embodiments refers to the accompanying drawings, which illustrate specific embodiments of the disclosed subject matter. Other embodiments having different structures and operations do not depart from the scope of the present disclosed subject matter.

DETAILED DESCRIPTION

In the disclosed subject matter, very-high-density organic materials are used as the material for composition of cellular telephone cases, to dramatically increase the rate of microwave absorption. Such materials include, but are not limited to, the following: Heavy hardwoods, composite materials in which hardwood particle is mixed with leather particle, cases composed of layers of hardwoods in alternative grain presentations, cases composed of layers of hardwood and leather, cases in which the layering of leather over hardwood results in significant increases in microwave absorption in comparison to either dense hardwood or leather alone, cases in which the adhesive material between layers has been augmented by the introduction of DNA rich materials, cases in which the adhesive material between layers has been augmented by microwave diffusing materials, including but not limited to Ferrite, for the purpose of reducing microwave migration into the body of the cellular telephone user.

Figure 1:
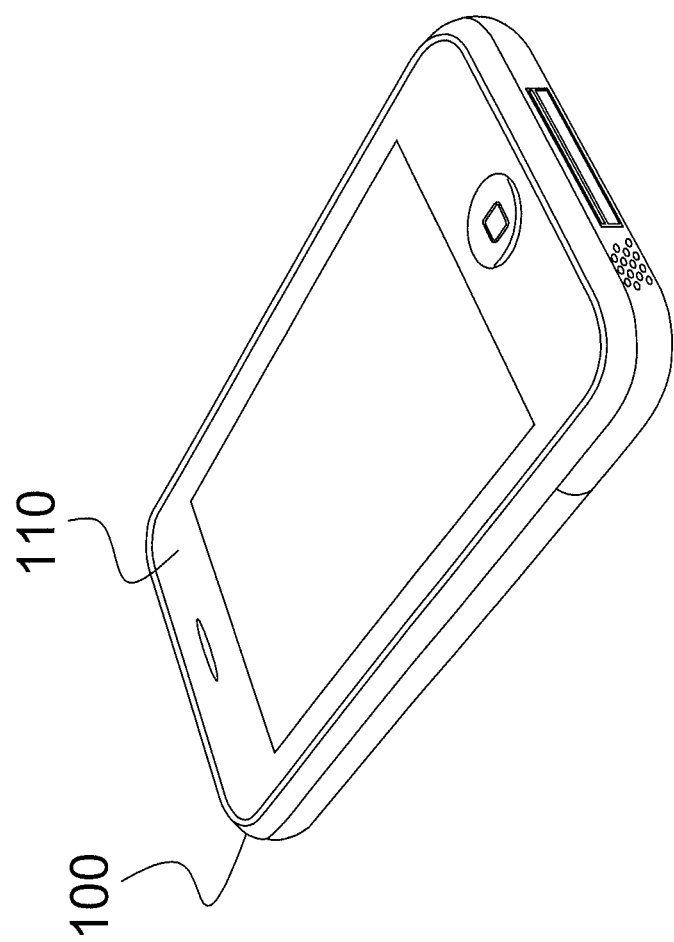
FIG. 1 is an illustration of a mobile phone case.

FIG. 1 shows at mobile phone 110 within a protective case 100. The protective case as described above is to prevent structural damage to the phone and/or provide a decorative element to the mobile phone. Cases come in many forms to protect and decorate the many different types of mobile phones and devices. Most have the attribute of allowing normal operations of the mobile phone or device while in the protective case. As noted above, the prior art cases are structured to protect the phone rather than the user.

Figure 2:
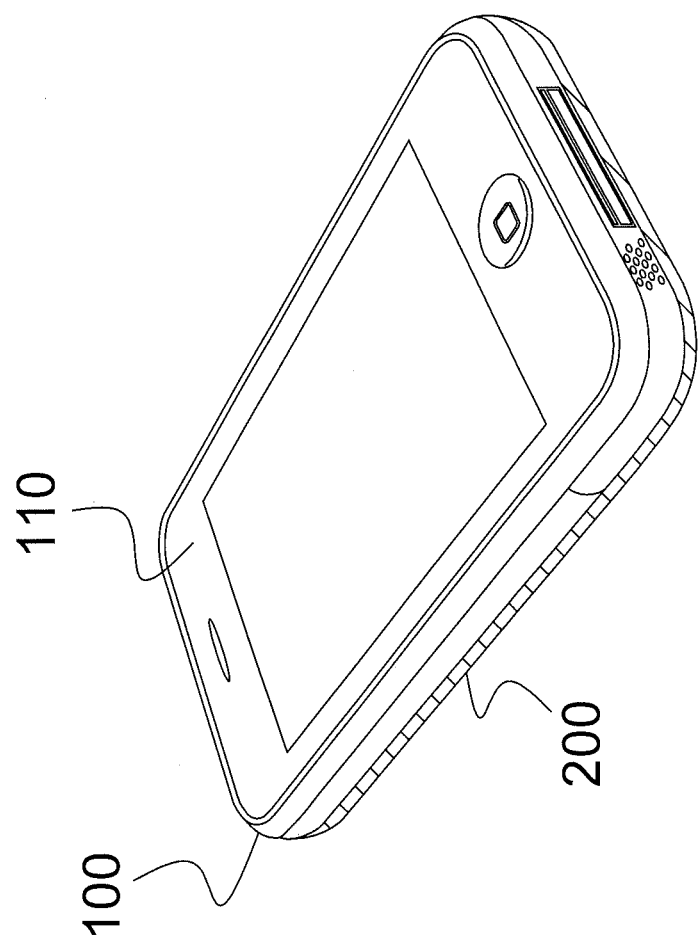
FIG. 2 is an illustration of an embodiment of a mobile phone case with DNA material according to an embodiment of the disclosed subject matter.

FIG. 2 shows the use of high density DNA containing materials 200, of a weight inconvenient for mere decorative use, such that the increased density of DNA material employed will result in an increase in absorption of microwave energy by a cellular telephone case 100 made of such selected and so fabricated materials. Materials here stated include but are not limited to leather and dense hardwood, of course many high density DNA containing materials may be advantageously selected.

For the use of high density DNA containing materials, thickened at the back (the area then carried adjacent to the skin), such that the additional thickness of such materials results in increased density of DNA material employed, so such increased thickness will result in an increase in absorption of microwave energy by a case so constructed.

Figure 3:
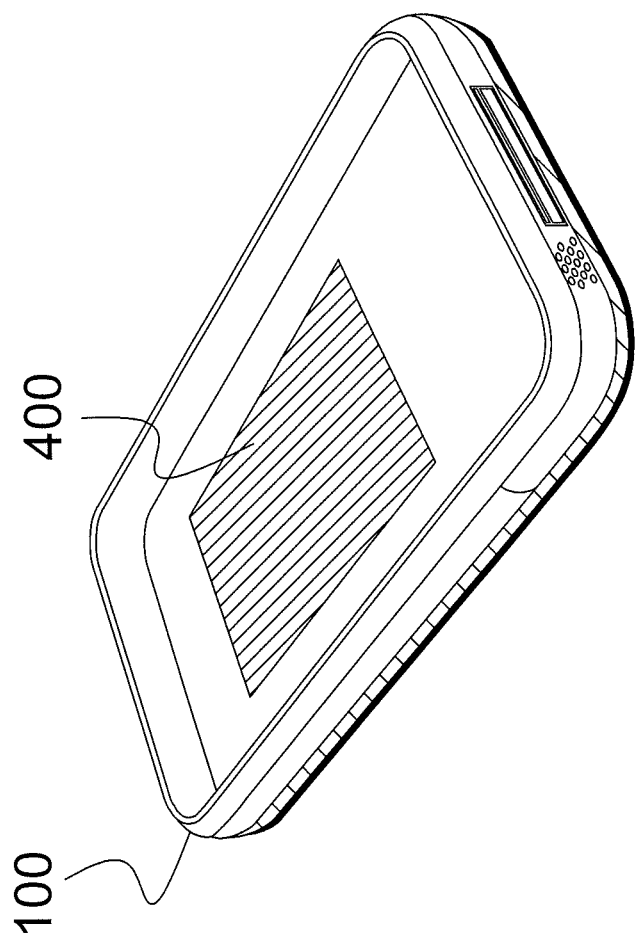
FIG. 3 is an illustration of an embodiment of a mobile phone case with a protective insert according to an embodiment of the disclosed subject matter.

FIG. 3 shows another embodiment of the use of high density DNA containing materials to protect the user. An insert 400 may be secured in the case 100 proximate to the location of the transmitting antenna to absorb microwave energy. The insert 400 is preferably made of multiple layers of DNA material as well as radiation dispersing materials. The insert 400 may be affixed to the inside of the case with adhesives or physically fastened with screws or other type of discrete fasteners. The insert 400 preferably is thin enough to allow the mobile phone to be fit in the case with out obstruction, and have an area commensurate to absorb the desired amount of radiation The area should be large enough to cover a significant portion of the inside of the case 100 without hindering the cases operation.

Figure 4:
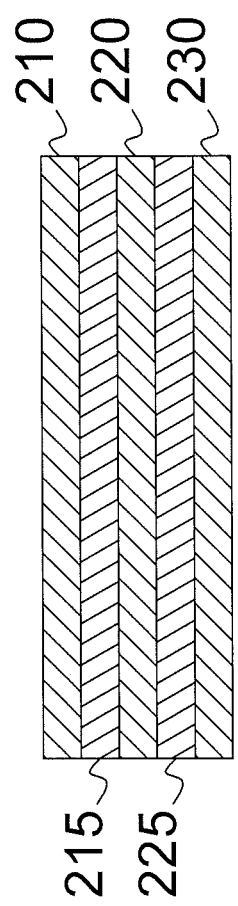
FIG. 4 is an illustration of multiple layers of DNA and dispersing materials for a mobile phone case according to an embodiment of the disclosed subject matter.

FIG. 4 shows the layering of the DNA containing material as well as layers of inorganic adhesive layers. The laminate construction of a cellular telephone/mobile phone case of different layers, including but not limited to the overlapping of leather 230 and dense hardwood 220 and 210 such that the lamination of such materials results in an increase in the Specific Absorption Rate (sometimes hereafter "SAR"). Embodiments of the disclosures subject matter may be realized in cases formed primarily of these layers, these layers may be used to cover a case made of other materials.

In all matters here stated, the increase in microwave absorption by the case results in reduced microwave into the body the user.

Inorganic materials 225, or adhesives containing inorganic materials 215 as shown in FIG. 4 may also be used in the laminate.

Composite materials composed of DNA rich base materials, including to adhered composites containing powders of leather, wood and animal bone, such that the resulting material, when configured into a cellular telephone case, results in increased SAR, may also be used in lieu of layering material, or in conjunction with such layers.

The use of paints, varnishes, glues, plastics, epoxies or other mediums which include composite materials composed of DNA rich base materials are envisioned. For the laminate construction of cellular telephone cases where the adhesive medium includes including adhesive or other layering material which has been imbued with materials increasing diffusion, including not only organic materials such as leather, wood and animal bone, but also inorganic materials such as ferrite, such that the resulting laminate case has an increased SAR.

What I claim is:

1. A mobile phone case for the protection of the user from non-ionizing radiation comprising:
    a back plate configured to receive a back side of the mobile phone, the back plate including a layer of DNA material at least in an area adjacent to a transmitting antenna of the mobile phone;
    a plurality of sides attached to the back plate and configured to reversible retain the mobile phone within the case.

2. The mobile phone case of claim 1, wherein the plurality of sides are comprised of the layer of DNA material.

3. The mobile phone case of claim 1, wherein the back plate comprises a plurality of Layers of DNA material, each layer being different from at least one of the other layers.

4. The mobile phone case of claim 1, wherein the layer of DNA material is a composite material containing DNA material dispersed within it.

5. The mobile phone case of claim 1, wherein the layer of DNA material is wood.

6. A mobile phone case for protecting the mobile phone from physical damage, in which the case removable receives the mobile phone and allows for operation of the mobile phone while received in the case, the case including a back plate covering the back of the mobile phone, a top and bottom plate for covering the top and bottom of the mobile phone and side plates for covering the sides of the mobile phone, the top, bottom and side plates connected to the back plate, the improvement comprising:
    an insert attached to the back plate and position between the back plate and the back of the mobile phone when the mobile phone is received by the case;
    said insert comprising a plurality of layers of DNA rich materials for absorbing non-ionizing radiation.

7. The mobile phone case of claim 6, wherein the insert further comprises at least one layer of non-organic material.

8. The mobile phone case of claim 7, wherein the at least one layer of non-organic material is an adhesive for adhering the insert to the case.

9. The mobile phone case of claim 7, wherein the at least one layer of non-organic material contains ferrite.

10. The mobile phone case of claim 6, wherein the plurality of layers of DNA rich material include an epoxy with DNA materials dispersed within.

11. An insert for a mobile phone case to protect the user from non-ionizing radiation emitted from the transmitter of a mobile phone, the insert comprising:
    a layer of DNA material; and,
    a layer of adhesive permanently affixed to the layer of DNA material;
    a slip sheet removable attached to the layer of adhesive, wherein the slip sheet protects the adhesive properties of the adhesive prior to removal;
    wherein the insert is flat and thin and configured to fit between a mobile phone case and the mobile phone when received by the mobile phone case.

12. The insert of claim 11, wherein the insert further comprises at least one layer of non-organic material.

13. The insert of claim 12, wherein the adhesive comprises non-organic material.

14. The insert of claim 12, wherein the at least one layer of non-organic material contains ferrite.

15. The insert of claim 11, wherein the insert further comprises a plurality of layers of DNA rich material.

16. The insert of claim 15, wherein the plurality of layers of DNA rich material includes an epoxy with DNA materials dispersed within.

* * * * *